E. L. CANTY.
MILK PAIL.
APPLICATION FILED MAR. 21, 1916.
1,221,673.
Patented Apr. 3, 1917.
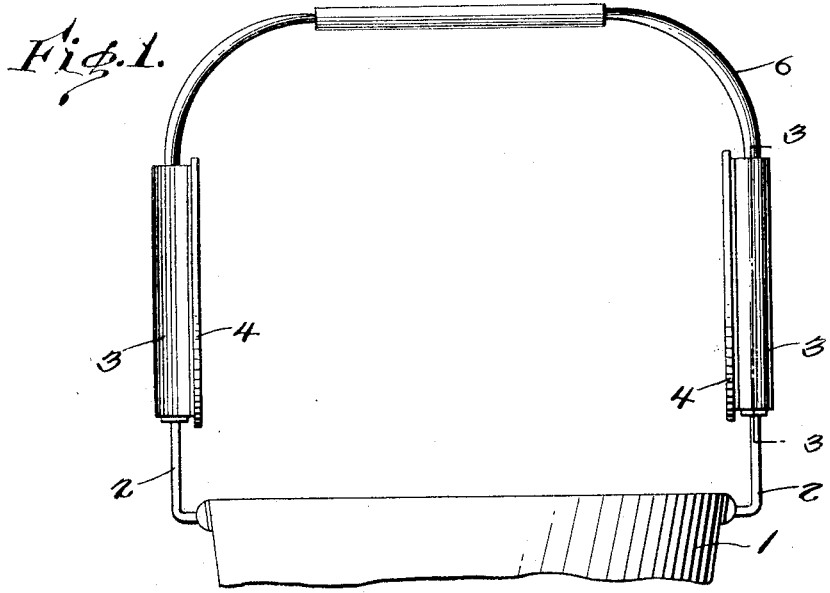
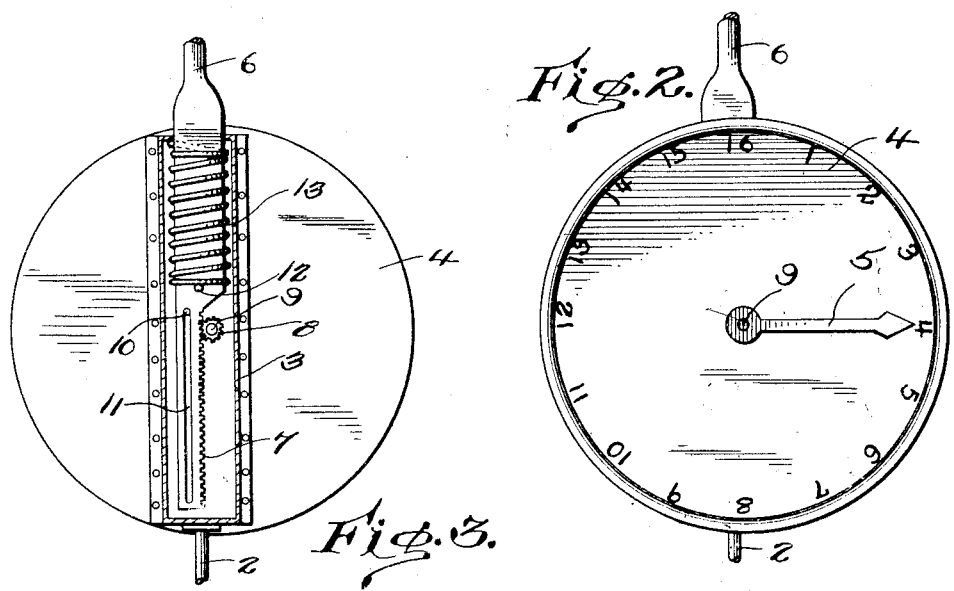
WITNESSES
Howard F. Costello
Wm. H. Mulligan
INVENTOR
Ernest L. Canty
BY Richard B. Owen,
ATTORNEY

UNITED STATES PATENT OFFICE.

ERNEST L. CANTY, OF AUGUSTA, MAINE.

MILK-PAIL.

1,221,673.

Specification of Letters Patent.

Patented Apr. 3, 1917.

Application filed March 21, 1916. Serial No. 85,668.

*To all whom it may concern:*

Be it known that I, ERNEST L. CANTY, a citizen of the United States, residing at Augusta, in the county of Kennebec and State of Maine, have invented certain new and useful Improvements in Milk-Pails, of which the following is a specification.

This invention relates to an improvement in milking pails and the primary object of the invention is to provide a pail which will contain means for weighing the contents of the pail, carried by the bail in a manner that will indicate the weight of the contents as soon as the pail is lifted from the ground.

The invention further aims to provide a pair of scales, one carried by each of the depending arms of the bail of the pail and designed to be out of the way of the user of the pail when the bail is in inoperative position.

A further object of this invention is the provision of a milking pail which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which:

Figure 1 is a fragmentary side elevation of an upper portion of a pail showing the device applied thereto.

Fig. 2 is a front elevation of one of the sections.

Fig. 3 is a section on the line 3—3 of Fig. 1.

The pail 1 has pivoted to its rim at opposite sides thereof the arms 2 which are attached to the end of a casing 3 in which the weighing mechanism is mounted. The casing has attached thereto a dial 4 which is provided with numerals around its periphery whereby an indicator arm 5 may be operated by the weighing mechanism to indicate the weight of the contents of the pail. The bail 6 has its depending arms extended through the casing 3 and formed adjacent its free ends are a plurality of rack teeth 7 which are designed to mesh with a pinion 8 carried by the pivot pin 9 at the center of the dial and upon which the indicator arm 5 is mounted. A pin 10 is carried by the dial 4 and projects through a slot 11 formed in the ends of the bail 6, the slot being disposed adjacent to the teeth 7 and designed to limit the downward movement of the pail when the scale is being operated. Interposed between the upper end of the casing 3 and the pin 12 which is carried by the depending arms of the bail 6 is a coil expansion spring 13 which surrounds the arms of the bail 6 and is designed to be contracted when the pail is lifted from the ground and when the contents thereof is to be weighed.

In the operation of the device, it will be observed by Fig. 2 of the drawing, that when the pail contains milk or other liquid and the pail is lifted off the ground by the bail 6, the pinion 8 will move downwardly and mesh with the teeth 7 of the rack which will cause the indicator arm 5 to rotate on the dial and the tension of the spring 13 will be regulated to cause the indicator arm 5 to point to the proper numerals of the dial for indicating the weight of the contents of the pail.

From the foregoing it will be observed that a very simple and durable milking pail has been provided, the details of which embody the preferred form. I desire it to be understood however, that slight changes or modifications in the minor details of construction may be made without departing from the spirit of the invention or the scope of the claims hereunto appended.

I claim:

1. In combination with a pail and a bail for the pail, dials supported by the pail and provided with a rotatable indicator, and means connected to the said bail and associated with the said dials for rotating the said indicator arm when the pail is lifted by the bail.

2. In combination with a pail and a bail for the pail the ends of the bail being disconnected from the pail, arms attached to opposite sides of the pail, housings carried by the said arms and adapted to receive the ends of the said bail, and means disposed within the housings and coöperating with the ends of the said bail for indicating the weight of the contents of the pail when the same is lifted by the said bail.

3. In combination with a pail and a bail for the pail, said bail having racks formed on its free ends, housings pivotally connected to the rim of the bail, and means mounted in said housings including pinions engaging with said rack for weighing the contents of said pail.

4. In combination with a pail and a bail for the pail, housings pivotally mounted on the pail at opposite sides thereof, and having dials secured thereto, a bail having its ends extended into said housings, and provided with serrations at their ends, and means mounted in said housings including pinions engaging with said serrations for weighing the contents of said pail.

5. In combination with a pail and a bail for the pail, a housing pivotally connected to the pail, a coil spring encircling one end of the said bail, the said spring bearing against one end of the said housing, a pin carried by the bail for receiving the opposite end of the spring, a rack formed on the end of the said bail, a pinion rotatably mounted within the housing and adapted to mesh with the said rack, the said housing also carrying a dial having an indicator arm associated with the said pinion.

In testimony whereof I affix my signature in presence of two witnesses.

ERNEST L. CANTY.

Witnesses:
J. A. FOLSOM,
C. Z. NOBLE.

Copies of this patent may be obtained for five cents each, by addressing the "Commissioner of Patents, Washington, D. C."